United States Patent Office 3,425,410
Patented Feb. 4, 1969

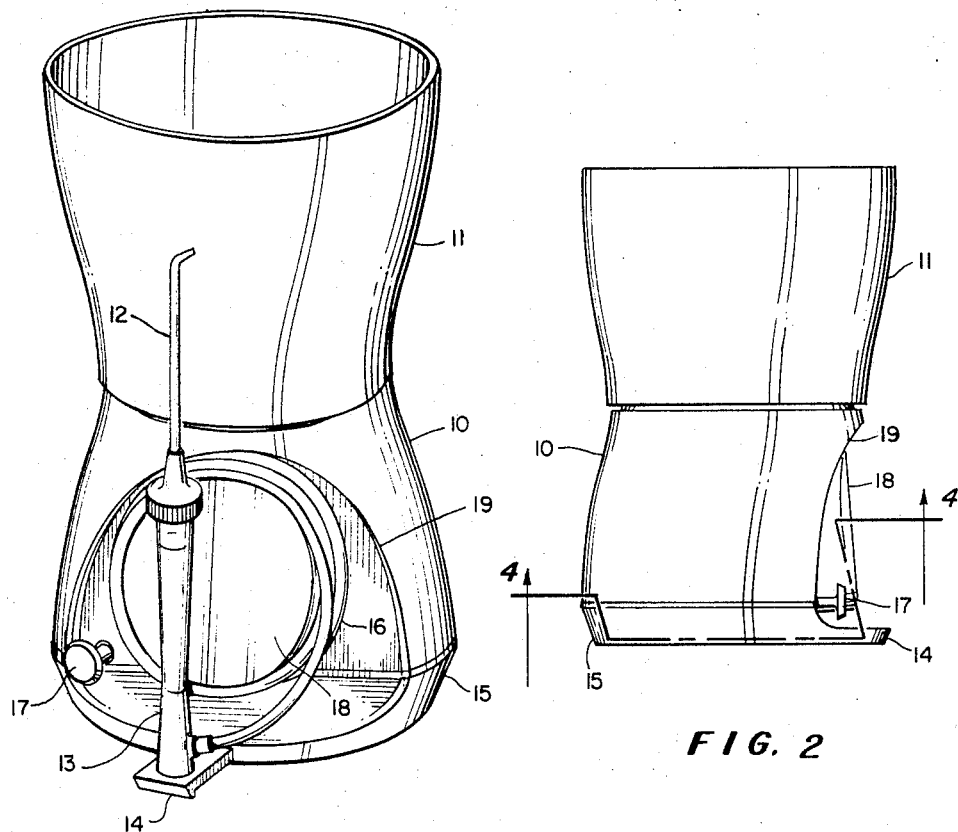

3,425,410
FLUID PRESSURE CONTROL FOR ORAL HYGIENE APPARATUS OF THE WATER JET TYPE
Michael A. Cammack, Fort Collins, Colo., assignor, by mesne assignments, to Aqua Tec Corporation, Denver, Colo., a corporation of California
Filed Sept. 8, 1966, Ser. No. 577,913
U.S. Cl. 128—66   5 Claims
Int. Cl. A61h 9/00; F04d 21/02; A61c 17/02

This invention relates to oral hygiene apparatus of the intermittent pulse jet type and particularly to an improved arrangement for controlling the fluid pressure in such apparatus.

The use of a water jet of small cross section and comprising intermittent pulses has been found effective for dislodging particles from between the teeth and for massaging the gum tissue and has been found particularly effective for dislodging foreign matter from the subgingival margins. The apparatus of the present invention is an improvement on the apparatus disclosed and claimed in United States Patent No. 3,227,158 granted to J. W. Mattingly on Jan. 4, 1966, and assigned to the same assignee as the present invention and is useful in the practice of the method disclosed and claimed in that patent.

It is an object of this invention to provide an improved pressure control for oral hygiene apparatus of the intermittent liquid pulse type.

It is another object of this invention to provide an improved oral hygiene apparatus including a simple and effective control for adjusting the internal pressure of the pump for producing liquid pulses.

Briefly, in carrying out the objects of this invention in one embodiment thereof, an oral hygiene appliance is provided which comprises a motor pump unit for producing liquid pulses at the rate of about 1200 pulses per minute and with sufficient kinetic energy of each pulse to depress a discrete area of the gum tissue and with spacing between individual pulses of sufficient duration to provide rebound time for the tissue. The pulses are formed by a nozzle having a cross sectional area of the order of 0.035 inch. The pump is driven by an electric motor and comprises a small cylinder having a piston therein reciprocated by a Scotch-yoke drive. The pressure within the reciprocating pump of the appliance is controlled by adjusting the position of a stop to control the closing position of the intake valve, the stop making it possible to provide pressures within a wide range from full pressure when the intake valve is permitted to close to a minimum pressure when it is held at its widest open position. The stop may be positioned by rotating a control knob and is easily and effectively adjustable to pressures within its predetermined range. By controlling the intake valve in this manner the effect of a by-pass is secured without requiring the complication of additional passages in the pump.

The features of novelty which characterize this invention are pointed out with particularity in the claims annexed to and forming a part of this specification. The invention itself, however, both as to its organization and manner of operation, together with further objects and advantages thereof may best be understood from the following description taken in connection with the accompanying drawings in which:

FIG. 1 is a perspective view of a oral hygiene appliance embodying the invention;

FIG. 2 is a side elevation view of the appliance of FIG. 1 with the nozzle and tubing removed;

Figure 3:
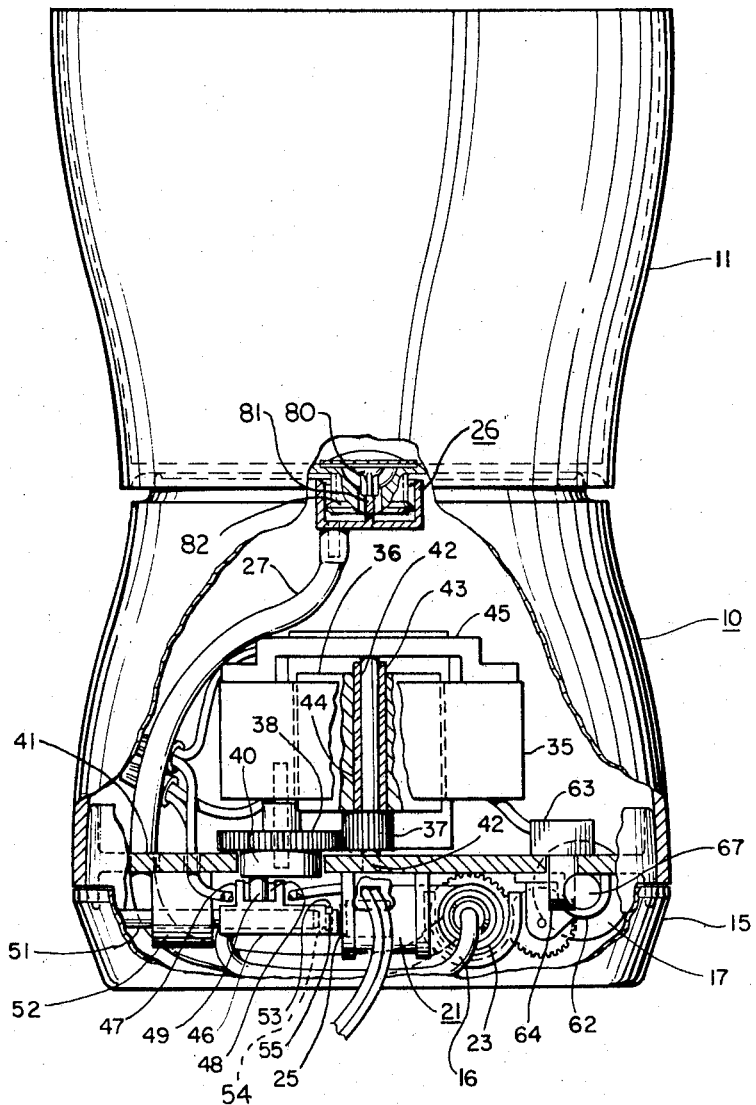
FIG. 3 is an enlarged elevation view partly in section and partly broken away showing the pump and control of the appliance of FIG. 1.

Referring now to the drawings, the appliance illustrated in FIGS. 1 and 2 comprises a housing 10 on which is mounted a removable reservoir or receptacle 11 for supplying water to a pump in the housing 10, the pump being described in connection with FIGS. 3 and 4 below. The pulsed stream of water is produced by the pump and discharged through a nozzle 12 detachably mounted on the handle 13 mounted on an extendable member or slide 14 which is slidably mounted in the base of housing 10, indicated at 15. The nozzle 12 is connected to receive the pulsed stream of liquid produced by the pump within the housing 10 through a coiled plastic conduit or tubing 16. The motor for driving the pump and producing the pulses is controlled by a rotatable and axially movable handle or knob 17 which actuates the motor switch and also controls the intensity of the stream discharged by the pump. The tubing is coiled about a projecting housing portion 18 arranged within a recess or opening 19, the housing portion 18 also constituting the casing for a part of the motor for driving the pump.

Figure 4:
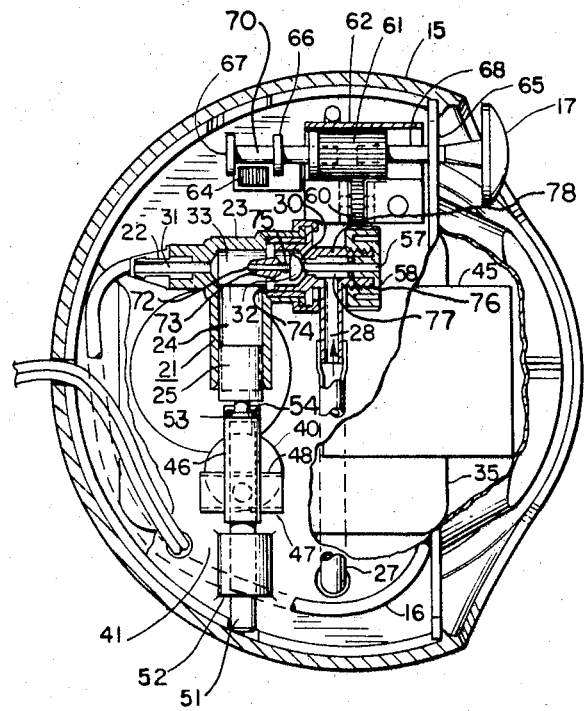
FIG. 4 is a bottom plan view partly in section and partly broken away of the mechanism of FIG. 3.

In order to produce the jet or stream of intermittent liquid pulses a pump 21 shown in FIGS. 3 and 4 is provided for discharging the stream through its outlet indicated at 22 and to which the tubing 16 is connected. The pump 21 comprises a cylinder block 23 having a cylinder 24 therein and a piston 25 mounted for reciprocation within the cylinder. Liquid from the reservoir 11 is supplied to the pump through a connection 26 between the reservoir 11 and the unit 10 and which admits water to a tubing 27 within the unit 10 which is connected to the inlet of the pump indicated at 28. The pump is provided with inlet and discharge ports 30 and 31, respectively, and an inlet valve 32 is provided to control the inlet port. The ports 30 and 31 are arranged in longitudinal alinement at the ends of a pump chamber 33 which is in open communication with the cylinder 24. It will now be seen that when the piston 25 is reciprocated it draws liquid in through the intake port 30 and on its return stroke forces liquid out through the discharge port 31. The operation of the pump is such that the inertia of the discharging liquid maintains the outward flow during the intake stroke of the piston and liquid is supplied through the intake port 30 without withdrawing liquid from the discharge port.

The piston 25 is driven by operation of a motor 35 of the two-pole, shaded type having a rotor 36 connected to drive a pinion gear 37 which is meshed with a driving gear 38 having a cylindrical extension 40 extending through a circular opening in a partition wall or motor plate 41 mounted within the housing 10. The rotor 36 is rotatably mounted on a fixed shaft 42 on bearings 43 and and 44. The lower bearing 44 is rigidly connected to the rotor and to the pinion gear 37. Fixed shaft 42 extends from a bracket indicated at 45 to the partition wall 41 by which it is supported at its other end. The piston is driven by reciprocation of a driving member 46 through a Scotch-yoke connection comprising a guide-way 47 on the member 46, and a slide 48 and a pin 49 mounted eccentrically on the disc 40 and journalled in the slide 48. The mechanism of the Scotch-yoke is well known and further description is not necessary to an understanding of the present invention.

The driving member 46 is slidably and rotatably mounted on a fixed pin 51 which is rigidly secured by a press fit in a projecting block or support 52 formed integrally with the partition wall 41. The piston 25 is connected to the driving member 46 by a headed projection 53 formed on the piston 25 and a complementary recess 54 formed in the end of the driving member 46. The recess 54 is formed with a lateral slot 55 at its top as shown in FIG. 3 and through which the headed member 53 may be inserted during the assembly of the mechanism.

Figure 5:
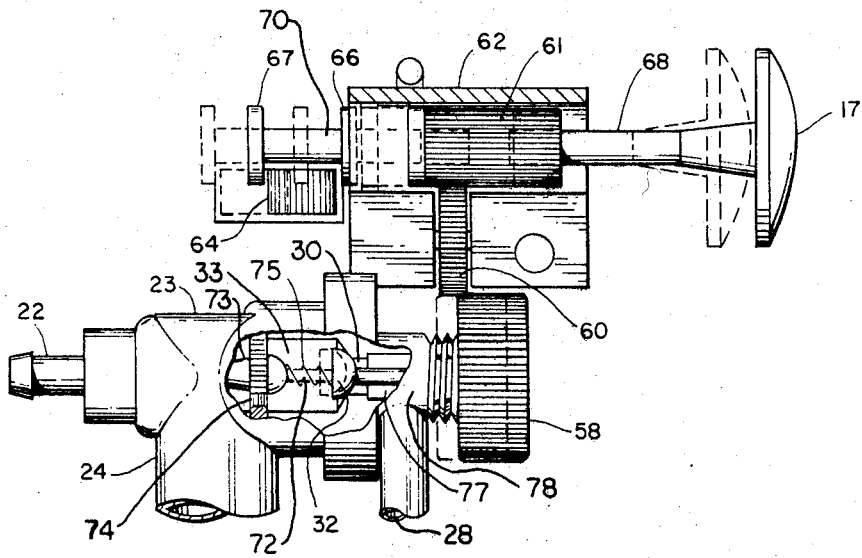
FIG. 5 is an enlarged view of the adjustable pressure control assembly of the pump.

The details of construction of the adjustable pressure control assembly are more clearly shown in FIG. 5 which illustrates the assembly when the intake valve is in its intake port sealing position and in position when the valve is held open by a rod or stop 57 as it is in FIG. 4. As shown in FIG. 5, the intake valve 32 is provided with a stem 72 which is slidably mounted in a sleeve 73 comprising the hub of a spider having arms 74 within the chamber 33. The valve 32 is biased toward its closed position by a light helical spring 75. During the operation of the pump liquid is drawn into the intake port 30 through the conduit 28 and enters the chamber 33. On the return stroke the valve is closed when the rod 57 is in the full line position shown; however, if the rod 57 is moved inwardly by turning the knob 58 to move the rod 57 to the left, the valve 32 will be held away from the seat or port 30 and a portion of the liquid forced into the chamber 33 by operation of the piston 25 will pass around the valve 32 through the port 30 and back into the passage 28. This return or by-pass of a portion of the liquid moved by the piston 25 reduces the pressure of the liquid discharged through the exhaust port 31 and conduit 22. In order to assure sealing of the assembly about the rod 57 an O-ring 76 of synthetic rubber or other suitable material is provided about the rod within a cylindrical bore 77 in the intake fitting 78 which is secured to the cylinder block 23 and also contains the intake port 30. The knob 58 is threadedly mounted on the intake fitting 78 and it moves axially when turned to position the rod 57 as desired for adjustment of the pressure of the liquid discharged by the pump. The turning of the knob 58 is effected by a gear comprising teeth formed on the knob and an idler gear 60 and a drive gear 61 on the assembly of the knob 17.

During the operation of pulsed jet dental apparatus, it is desirable that the intensity of the jet stream may be adjusted so that the kinetic energy of the individual pulses may be changed in accordance with the requirements of the user. This enables the operator to provide the optimum kinetic energy for depressing discrete areas of the particular gum tissue on which the jet stream is used. This adjustment is effected in the appliance illustrated by adjusting the pressure of the liquid discharged by the pump through the port 31. In the illustrated embodiment this adjustment is accomplished by changing the degree of closing of the inlet valve 32 between its position seated on the port 30 to a position substantially spaced from the port as shown in FIG. 4. The stop comprises a rod 57 rigidly attached to a knob 58 which is formed as a gear meshing with the intermediate or idler gear 60 which meshes with a gear 61 on the assembly of the control knob 17. When the knob 17 is turned the gear 61 turns and moves the gear 60 and gear 58 to change the position of the stop 57 with respect to the intake port 30. It will thus be apparent that the pressure within the pump chamber 33 may be varied by altering the effect of the intake valve 32 from its fully closed position, which is the high pressure position, to its fully open position illustrated in FIG. 4; intermediate positions, of course, provide pressures in between the pressures at the two ends.

The control knob 17 not only is rotatable, but also is longitudinally or axially movable. The knob assembly is rotatably mounted by journalling the gear 61 within a sleeve 62 rigidly mounted on the motor plate 41 and which acts as a bearing and maintains the gear 61 in mesh with the gear 60. The motor 35 is energized under control of an "on"-"off" switch 63 having an operating lug or button 64 movable in a straight line between "on" and "off" positions. Switches of this type are well known and readily available. The knob 17 is arranged to actuate the switch button 64 by movement foward and away from the front plate of the appliance unit indicated at 65. In order to actuate the switch 64 the knob 17 is provided with two parallel round discs 66 and 67 which are spaced and positioned with the button 64 lying between them and with some play so that the button fits loosely between the two discs. When the knob 17 is pulled out from its position shown in the drawings, the disc 67 engages the switch button 64 and moves it forward until it reaches its "on" position and energizes the motor. In a similar manner, when the motor is to be turned off, the knob is pressed in and the disc 66 engages the button 64 and moves the switch to its "off" position. The gear 61 is elongated and remains in mesh with the gear 60 throughout the longitudinal movement of the knob 17. In the construction illustrated, the knob 17 is provided with a shaft 68 which is rigidly secured centrally of the gear 61 by a press fit and the discs 66 and 67 are mounted on a rod or shaft 70 similarly rigidly secured to the gear 61. This complete assembly provides an effective and easily operated mechanism for controlling the operation of the pulsed jet appliance and effects the operation by a single control easily accessible to the user. It will be clear that the switch may be operated regardless of the rotated position of the knob 17 and similarly the pressure setting may be adjusted regardless of the axial or longitudinal position of the knob. This combination of controls may be employed with other types of rotatably adjustable pressure controls.

The arrangement of the assembly of the knob 17 to effect adjustment of a rotatable pressure control element and also to actuate the switch and also the construction of the pump drive to include a universal joint or coupling are not my invention but are the inventions of John W. Mattingly and are disclosed and claimed in a copending application Ser. No. 578,053 filed of even date herewith and assigned to the same assignee as the present invention.

While the invention has been illustrated and described with reference to a specific embodiment thereof, various other variations and modifications will occur to those skilled in the art. Therefore, it is not desired that the invention be limited to the specific details illustrated and described and it is intended by the appended claims to cover all modifications which fall within the spirit and scope of the invention.

I claim:

1. A system for treating gum tissue by applying spaced pressure pulses of liquid to depress discrete areas of gum tissue with the spacing of said pulses one from the other of duration which provides for rebound time for said gum tissue comprising a liquid pump of the reciprocating type having a piston therein and an intake port and a discharge port, means for supplying fluid to said intake port, means for preventing reverse flow of fluid through said intake port, means for reciprocating said piston for alternating drawing liquid through said intake port and producing pressure pulses in said cylinder whereby a pulsed flow of liquid is produced through said discharge port, and means for modifying the action of said means for preventing reverse flow for affording limited reverse flow through said intake port to return a portion of the fluid through said intake port to modify the pressure of fluid discharged through said discharge port.

2. A system for treating gum tissue as set forth in claim 1 wherein said means for preventing reverse flow of fluid through said intake port comprises an intake valve movable toward and away from said port, and wherein said means for modifying the action of said reverse flow means comprises a stop positioned to limit the movement of said intake valve toward said intake port.

3. A liquid pump of the pulsed discharge type for an oral hygiene appliance or the like comprising a block having a pump chamber therein and a pump cylinder in communication with the chamber, said chamber having an intake port and an exhaust port, an intake valve mounted adjacent said intake port for controlling the passage of liquid therethrough, a piston in said cylinder, means for reciprocating said piston, and means for controlling the pressure of liquid discharged through said exhaust port, said control means comprising an adjustable stop mounted adjacent said intake valve for selecting the closing position of said valve during the discharge stroke of said piston whereby a portion of the liquid may be returned through said intake port to modify the pressure of the liquid discharged from said pump.

4. A liquid pump of the pulse discharge type as set forth in claim 3 wherein said chamber is a generally cylindrical configuration and said intake and exhaust ports are positioned at opposite ends thereof and wherein said intake valve comprises a valve head and a valve stem extending in alinement with the longitudinal axis of said chamber, said adjustable stop comprises a rod positioned within said intake port and movable toward and away from said intake valve for engaging of said intake valve and limiting its approach to said intake port, said rod in one position affording the seating of said valve on the intake port and at its opposite extreme position affording maximum passage of discharging liquid through said port on the discharge stroke of said piston.

5. A liquid pump of the pulsed discharge type for an oral hygiene appliance as set forth in claim 3 wherein said stop comprises a pin arranged to move through said intake port into engagement with said intake valve and means providing an opening in said block adjacent said intake port and a threaded cap for closing said opening, said rod being rigidly secured to said cap whereby the rod is moved toward and away from said intake valve by turning said cap, means for admitting liquid to said intake port adjacent said cap and means including an O-ring of resilient material arranged about said rod and engaging with the adjacent wall of said block for sealing the passage between said intake valve and the exterior of said block.

References Cited

UNITED STATES PATENTS

| | | | |
|---|---|---|---|
| 1,004,892 | 10/1911 | Morgan | 103—41 |
| 1,814,089 | 7/1931 | Lapointe | 103—41 |
| 3,227,158 | 1/1966 | Mattingly | 128—66 |

L. W. TRAPP, *Primary Examiner.*

U.S. Cl. X.R.

103—41; 128—234